No. 644,366. Patented Feb. 27, 1900.
A. NEWELL.
LOCKING ADJUSTMENT FOR JOURNAL BEARINGS.
(Application filed Oct. 12, 1899.)
(No Model.)
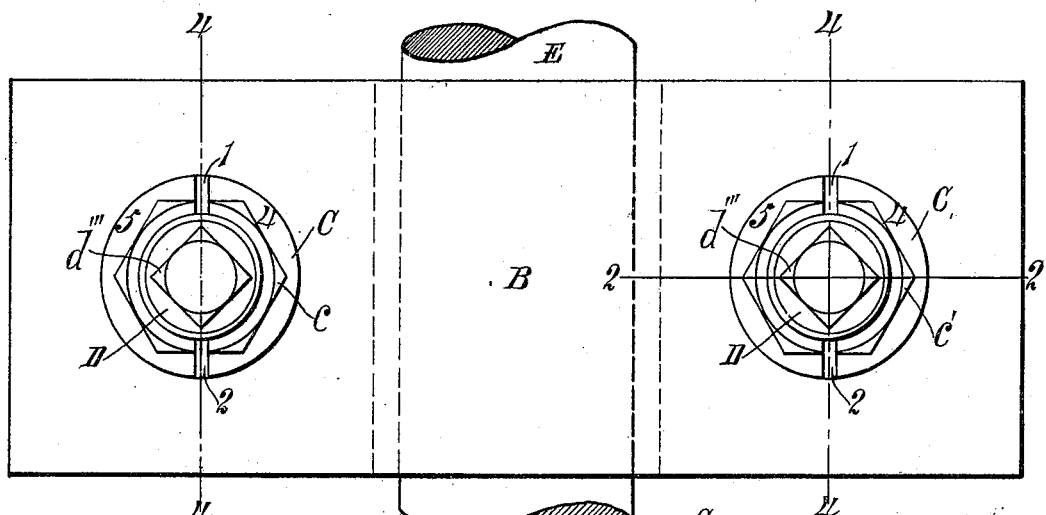
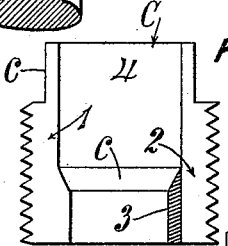
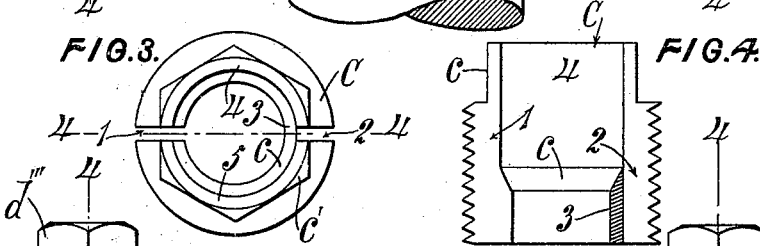
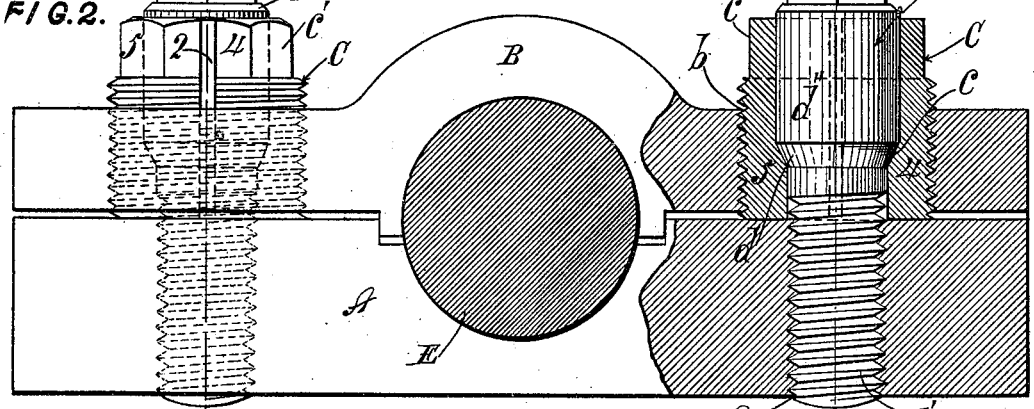
WITNESSES.
Perry Kingman
J. Townsend
INVENTOR.
Augustus Newell
by Townsend Bro
his ATTORNEYS
THE NORRIS PETERS CO., PHOTO-LITHO., WASHINGTON, D. C.

UNITED STATES PATENT OFFICE.

AUGUSTUS NEWELL, OF PASADENA, CALIFORNIA, ASSIGNOR OF ONE-HALF TO FRED H. GANSBERGEN, OF CHICAGO, ILLINOIS.

LOCKING ADJUSTMENT FOR JOURNAL-BEARINGS.

SPECIFICATION forming part of Letters Patent No. 644,366, dated February 27, 1900.

Application filed October 12, 1899. Serial No. 733,373. (No model.)

*To all whom it may concern:*

Be it known that I, AUGUSTUS NEWELL, a citizen of the United States, residing at Pasadena, in the county of Los Angeles and State of California, have invented a new and useful Locking Adjustment for Journal-Bearings and for other Uses, of which the following is a specification.

The object of my invention is to provide a locking device for adjustably securing two members together.

This invention is especially useful in adjusting journal-bearings.

It is possible with this adjustment to perfectly adjust the journal-bearings of an engine while the engine is in motion, thus greatly facilitating the perfect adjustment of the bearings.

The accompanying drawings illustrate my invention.

Figure 1 is a plan of my newly-invented adjustment as applied in a journal-bearing. Fig. 2 is an elevation of said bearing with a portion thereof in section on line 2 2, Fig. 1. Fig. 3 is a plan of the hollow adjusting-screw. Fig. 4 is a section of the adjusting-screw on line 4 4, Figs. 1, 2, and 3.

A indicates a base member provided with a screw-threaded hole $a$.

B indicates an adjustable member provided with a screw-threaded hole $b$ of greater diameter than the hole $a$ in the base member.

C indicates a hollow expansible screw provided with a tapering seat $c$ and screwed into the adjustable member B and extending through the adjustable member to engage with the base member A to gage the distance between the adjustable member and the base member.

D indicates an adjusting and locking screw provided with a tapered portion $d$ to seat in the tapered seat $c$ and provided with a screw-threaded portion $d'$, screwed into the hole $a$ in the base member A. The screw D is also provided with a smooth cylindrical body $d''$ to fit in a corresponding portion of the chamber of the hollow screw C. In the journal-bearing two sets of these screws are shown, one set on either side of the shaft E.

The hollow expansible screw C is provided at its upper end with an angular head $c'$, so that the screw can be readily turned. $d'''$ is an angular head on the upper or outer end of the screw D for a like purpose.

The hollow expansible screw C is longitudinally slitted throughout one side, as shown at 1, and is longitudinally slitted on the other side throughout the upper and outer portion of said screw, as at 2, thus leaving a spring connection 3 at the lower and inner portion of the screw to hold the two members 4 5 of the slitted screw together when the screws are loosened or unscrewed.

V-threads are used for the expansible screw C and the hole $b$, into which it screws, so that when the hollow screw is expanded by the tapering portion of screw D its threads will wedge into the threads of the threaded hole, thereby being made frictionally tight in the hole $b$, into which it screws without changing the position of the adjustable member D.

In practice to assemble the parts the expansible screw C will be screwed to the appropriate position to hold the adjustable member B at an approximately-correct distance from the base member A, and the screws D are then inserted through the hollow screws C and are screwed into the holes $a$ in the base member. The screws C and D are then turned to the proper adjustment, and then the screws D are screwed home to expand the screws C in the screw-holes $b$ and also to clamp the hollow screws firmly against the base member. The tapered shoulder $d$ of the screw D and the sloping shoulder $c$ of the screw C operate to spread the hollow screw apart when the screw D is screwed home and also to positively fasten the hollow screw to the base member. The friction of the tapered shoulders holds both screws from jarring loose and unscrewing.

What I claim as new, and desire to secure by Letters Patent of the United States, is—

1. The combination of a base member provided with a screw-threaded hole; an adjustable member provided with a screw-threaded hole of larger diameter than that in the base member; a hollow expansible screw provided with a tapering seat and screwed into the adjustable member; and a locking-screw provided with a tapered portion to seat in the tapered seat and provided with a screw-threaded portion screwed into the base member.

2. A hollow expansible screw provided with an internal tapering seat and being longitudinally slitted throughout one side and longitudinally slitted throughout a portion of the other side.

3. An adjusting device comprising a base member having a threaded hole; an adjustable member provided with a V-threaded hole; a hollow expansible V-threaded screw to screw in the V-threaded hole and provided with a tapering seat; and a locking-screw provided with a tapering shoulder to fit said seat and with a threaded portion screwed into the hole in the base member.

In testimony whereof I have signed my name to this specification, in the presence of two subscribing witnesses, at Los Angeles, California, this 6th day of October, 1899.

AUGUSTUS NEWELL.

Witnesses:
JAMES R. TOWNSEND,
FRANCIS M. TOWNSEND.